US010356297B2

(12) United States Patent
Miyakawa et al.

(10) Patent No.: US 10,356,297 B2
(45) Date of Patent: Jul. 16, 2019

(54) ILLUMINATION DEVICE MOUNTED WITH A PLURALITY OF OPTICAL ACCESSORIES

(71) Applicant: CANON KABUSHIKI KAISHA, Tokyo (JP)

(72) Inventors: Toshiki Miyakawa, Yokohama (JP); Azusa Sugawara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 15/402,563

(22) Filed: Jan. 10, 2017

(65) Prior Publication Data
US 2017/0201659 A1 Jul. 13, 2017

(30) Foreign Application Priority Data

Jan. 13, 2016 (JP) .................. 2016-004452

(51) Int. Cl.
*H04N 5/225* (2006.01)
*F21V 13/02* (2006.01)
*G03B 15/05* (2006.01)

(52) U.S. Cl.
CPC ........... *H04N 5/2256* (2013.01); *F21V 13/02* (2013.01); *G03B 15/05* (2013.01); *H04N 5/2254* (2013.01); *G03B 2215/055* (2013.01); *G03B 2215/0592* (2013.01)

(58) Field of Classification Search
CPC ........ F21V 13/02; F21V 17/00; F21V 17/002; F21V 17/16; G03B 15/03–05; G03B 2215/055; G03B 2215/0592; H04N 5/2254; H04N 5/2256
See application file for complete search history.

(56) References Cited

U.S. PATENT DOCUMENTS

| 4,251,854 | A | * | 2/1981 | Kaneko | .................. | G03B 15/05 |
| | | | | | | 362/5 |
| 4,991,063 | A | * | 2/1991 | Stoneham | ............... | F21V 13/04 |
| | | | | | | 362/18 |
| 5,678,075 | A | * | 10/1997 | Doukas | .................. | G03B 15/03 |
| | | | | | | 362/13 |
| 7,810,941 | B2 | * | 10/2010 | Capozzi | ................. | G03B 15/02 |
| | | | | | | 362/11 |
| 7,946,719 | B2 | * | 5/2011 | Fong | ...................... | G03B 15/03 |
| | | | | | | 362/16 |

(Continued)

FOREIGN PATENT DOCUMENTS

| JP | 2002-169202 A | 6/2002 |
| JP | 2009-020298 A | 1/2009 |

*Primary Examiner* — Anh T Mai
*Assistant Examiner* — Michael Chiang
(74) *Attorney, Agent, or Firm* — Carter, DeLuca & Farrell LLP (57) ABSTRACT

An illumination device capable of enhancing design thereof and facilitating removable mounting operation of optical accessories. A bounce adapter 10 and a color filter 20 are mountable to a strobe device 300 so that the bounce adapter 10 and color filter 20 are arranged in a front part of a light emitting unit 350. A top surface 350a of the light emitting unit 350 is provided with an attachment rib 355a to be engaged with the bounce adapter 10 and the color filter 20. A bottom cover 353 of the light emitting unit 350 is provided with holes 354a, 354d to be engaged with the bounce adapter 10 and holes 354b, 354c to be engaged with the color filter 20.

8 Claims, 6 Drawing Sheets (56) References Cited

U.S. PATENT DOCUMENTS

| | | | | |
|---|---|---|---|---|
| 8,162,497 B2* | 4/2012 | Gonzalez | ............... | G03B 15/02 |
| | | | | 362/16 |
| 2016/0147108 A1* | 5/2016 | Takemoto | ......... | G02F 1/133308 |
| | | | | 362/633 |

* cited by examiner

ILLUMINATION DEVICE MOUNTED WITH A PLURALITY OF OPTICAL ACCESSORIES

BACKGROUND OF THE INVENTION

Field of the Invention

The present invention relates to an illumination device to which a plurality of optical accessories is mountable.

Description of the Related Art

Conventionally, a known example of the illumination device to which the optical accessories are mountable includes a strobe device. A known example of the optical accessories mounted to an emission window of a light emitting unit of the strobe device includes a light diffusion adapter (bounce adapter) and characteristics-of-color changing filter (color filter). The bounce adapter is an optical accessory capable of diffusing irradiation light from the light emitting unit at a wide angle. The color filter is an optical accessory capable of changing a color temperature of strobe light.

For example, Japanese Laid-Open Patent Publication (kokai) No. 2002-169202 discloses a bounce adapter removably mounted on a light emitting unit of a strobe device. In a device disclosed in Japanese Laid-Open Patent Publication (kokai) No. 2002-169202, the bounce adapter is removably mountable by using a recessed part provided to a side surface of the light emitting unit and an engagement protrusive part formed in an inner surface of the bounce adapter. However, the device disclosed in Japanese Laid-Open Patent Publication (kokai) No. 2002-169202 is not configured to simultaneously or exclusively use optical accessories for different uses such as the bounce adapter and color filter.

On the other hand, Japanese Laid-Open Patent Publication (kokai) No. 2009-20298 discloses a technique for correcting a shooting color temperature by defining recognition signals of every optical accessories and by reading out recognition information regarding the optical accessories mounted on a strobe device so as to recognize types of the optical accessories. However, details on attachment ways of the optical accessories are not disclosed in Japanese Laid-Open Patent Publication (kokai) No. 2009-20298.

In general, in order to simultaneously or exclusively use optical accessories for different uses such as the bounce adapter and color filter, it is necessary to provide attachment parts respectively for the bounce adapter and color filter to a light emitting unit. For example, both side portions of a light emitting unit of a strobe device are provided with an attachment part for one optical accessory, and an upper part and lower part of the light emitting unit are provided with an attachment part for the other optical accessory. In a case of applying such a configuration, the attachment parts are exposed from both top and bottom parts as well as left and right sides when the optical accessories are not mounted so that the device does not look attractive. Especially, the both sides of the light emitting unit are conspicuous. Therefore, providing the recessed part in the side surface of the light emitting unit as disclosed in Japanese Laid-Open Patent Publication (kokai) No. 2002-169202 may easily have an effect on appearance. Therefore, some consideration is needed in order to improve a design when providing the attachment parts for the optical accessories.

Considering that a configuration is adopted in which two optical accessories can be used simultaneously but each optical accessory should be removably mounted in order. In such a case, a removable mounting operation is troublesome and there is necessity for improvement from an operational point of view.

SUMMARY OF THE INVENTION

The present invention provides an illumination device, which is capable of enhancing design of the illumination device and facilitating removable mounting operation of optical accessories.

Accordingly, the present invention provides an illumination device to which a first optical accessory and a second optical accessory are mountable so that the first optical accessory and second optical accessory are arranged in a front part of a light emitting unit, wherein one of a top surface and a bottom surface of the light emitting unit is provided with a first protrusive part to be engaged with the first optical accessory and a second protrusive part to be engaged with the second optical accessory, and the other of the top surface and bottom surface of the light emitting unit is provided with a first recessed part to be engaged with the first optical accessory and a second recessed part to be engaged with the second optical accessory.

According to an embodiment of the present invention, it is possible to enhance the design of the illumination device and to facilitate the removable mounting operation of the optical accessories.

Further features of the present invention will become apparent from the following description of exemplary embodiments (with reference to the attached drawings).

DESCRIPTION OF THE EMBODIMENTS

Hereinafter, an embodiment of the present invention will be described with reference to the accompanying drawings.

Figure 1:
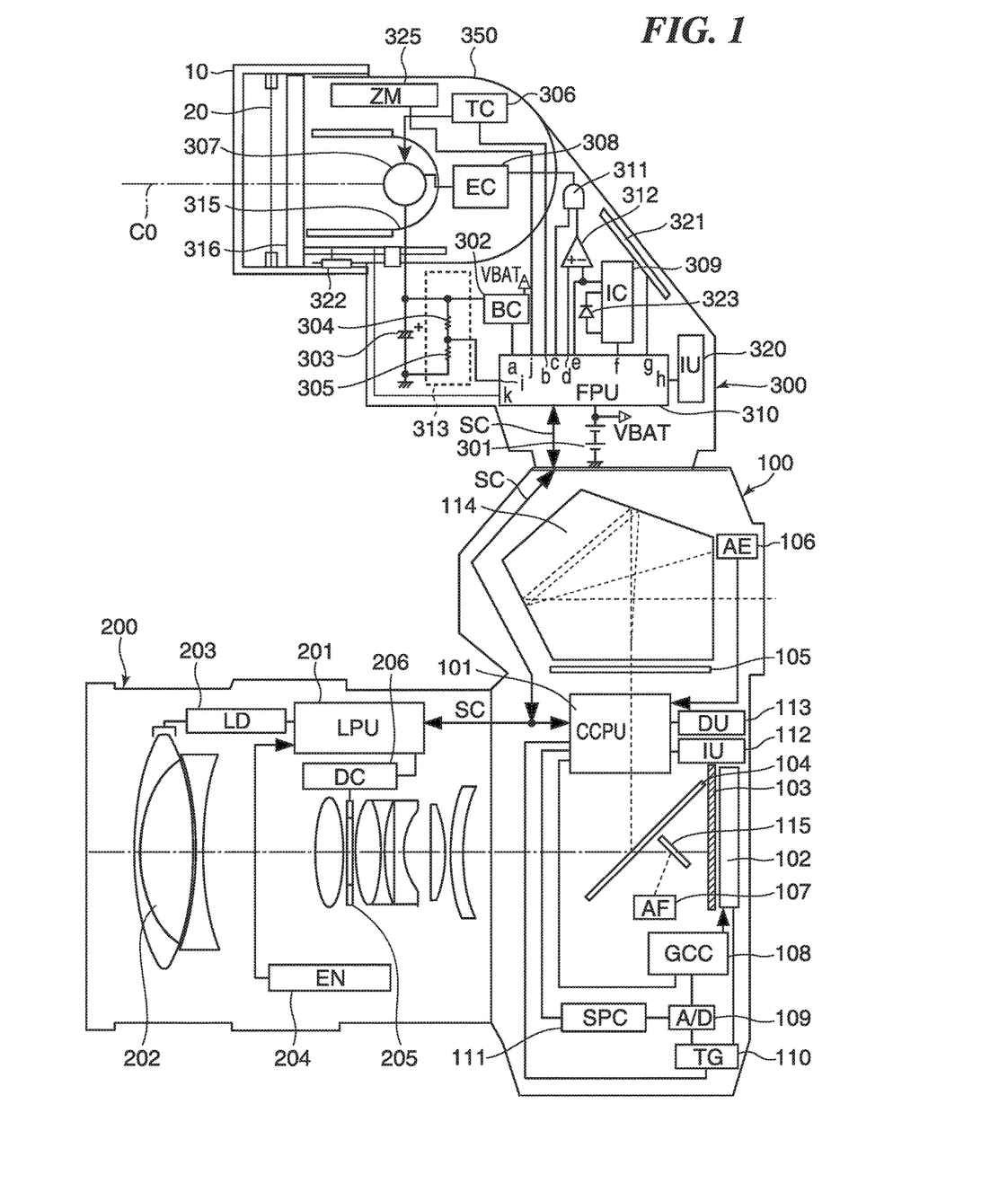
FIG. 1 is a block diagram showing a configuration of an image pickup system including an illumination device.

FIG. 1 is a block diagram showing a configuration of an image pickup system including an illumination device according to a first embodiment of the present invention. The image pickup system includes a camera body 100 which is an image pickup apparatus, a lens unit 200 which is removably mountable on the camera body 100, and a strobe device 300 which is an illumination device removably mountable on the camera body 100. In regard to a vertical direction of the strobe device 300, it should be noted that a vertical direction in FIG. 1 corresponds to that of the strobe device 300. In regard to a longitudinal direction of the strobe device 300, it should be noted that a left side of FIG. 1 is a front side. A bounce adapter 10 (first optical accessory) and a color filter 20 (second optical accessory) are illustrated as optical accessories. Those optical accessories are removably mountable on a front part of a light emitting unit 350 of the strobe device 300. The bounce adapter 10 is a light diffusion adapter capable of diffusing light transmitting therethrough.

The color filter 20 is a characteristics-of-color changing filter capable of changing characteristics of color of the light transmitting therethrough. The strobe device 300 mounted (fitted) with the bounce adapter 10 and color filter 20 is defined as an illumination system herein.

First, a configuration of the camera body 100 will be described. A camera microcomputer (CCPU) 101 controls each part of the camera body 100. Examples of an image pickup device 102 are CCD and CMOS. When not shooting, a shutter 103 shades the image pickup device 102. When shooting, the shutter 103 is driven to introduce luminous flux into the image pickup device 102. When not shooting, a main mirror (half mirror) 104 reflects some light incident from a lens group 202 (to be mentioned later) and forms an image on a focusing plate 105. The image on the focusing plate 105 is guided to an optical finder and the like through a pentaprism 114 and is used for confirmation of a focusing state of a subject to be shot. A photometry circuit 106 includes a photometry sensor (AE sensor) and a focus detection circuit 107 includes a focus detection sensor (AF sensor). A gain conversion circuit (GCC) 108 converts amplification gain of a signal from the image pickup device 102.

An A/D converter 109 converts an amplified analog signal from the image pickup device 102 to a digital signal. A timing generator (TG) 110 synchronizes the signal from the image pickup device 102 and a conversion timing in the A/D converter 109. A signal processing circuit (SPC) 111 conducts image processing including white balance control with respect to image data converted to the digital signal by the A/D converter 109. A signal line SC is a communication line in an interface between the camera body 100, lens unit 200, and strobe device 300. An input unit (IU) 112 includes various operation parts such as a release switch for starting a shooting operation. A displaying unit (DU) 113 displays various settings, shooting information, and the like. The pentaprism 114 guides luminous flux incident from the lens group 202 and reflected off the main mirror 104 into the AE sensor inside the photometry circuit 106 and into the optical finder. A sub mirror 115 guides luminous flux incident from the lens group 202 and transmitted through a semitransparent part of a center of the main mirror 104 into the AF sensor of the focus detection circuit 107.

Next, an internal configuration and operation of the lens unit 200 will be described. A lens microcomputer (LPU) 201 controls operations of each part in the lens unit 200. The lens group 202 includes a plurality of lens. A lens driving part (LD) 203 moves the lens group 202 in accordance with instructions from the lens microcomputer 201, for example, changes in focus adjustment and a focus distance. An encoder (EN) 204 detects a position of the lens group 202 or a driving rate of the lens group 202. A diaphragm 205 adjusts an amount of the light incident upon the image pickup device 102 by changing a diameter of an aperture. The diaphragm 205 is controlled by the lens microcomputer 201 through a diaphragm control circuit (DC) 206.

Next, a configuration of the strobe device 300 as the illumination device will be described. A body of the strobe device 300 is provided with a strobe microcomputer (FPU) 310, input unit 320, and displaying unit 321. The body of the device is also provided with a battery 301, booster circuit (BC) 302, main capacitor 303, resistor 304, resistor 305, integrated circuit (IC) 309, AND gate 311, comparator 312, voltage detection circuit 313, photodiode 323, and the like. The light emitting unit 350 is disposed in the front part of the strobe device 300 (a subject side). The light emitting unit 350 is connected to the body of the device by a hinge system (not shown) and is pivotable in the vertical direction for shooting with bounce flash.

The light emitting unit 350 mainly includes a trigger circuit (TC) 306, discharge tube 307, emission control circuit (EC) 308, reflective umbrella 315, Fresnel lens 316, accessory determination unit 322, zoom monitor (ZM) 325, and the like. The trigger circuit 306 is connected to the strobe microcomputer 310 and outputs trigger voltage when the discharge tube 307 emits light and the trigger circuit 306 receives a trigger signal from the strobe microcomputer 310. The discharge tube 307 is a main light source configured to emit light with using energy charged in the main capacitor 303 when the trigger voltage of several KV is applied from the trigger circuit 306 and is stimulated. The emission control circuit 308 controls light emission of the discharge tube 307.

The reflective umbrella 315 reflects light emitted from the discharge tube 307 in an incident direction (in front of an optical axis C0) of the light emitting unit 350. The Fresnel lens 316 reduces nonuniformity in the light emitted from the discharge tube 307. The Fresnel lens 316 is also an irradiation part which widens an irradiation range of the light emitted from the discharge tube 307. When flush light emitted from the discharge tube 307 is reflected off the reflective umbrella 315, the Fresnel lens 316 controls light distribution of luminous flux of the reflected flush light. It is possible to change a guide number and the light distribution by changing a relative distance between the reflective umbrella 315 and Fresnel lens 316. The zoom motor 325 includes a zoom circuit and encoder and moves the reflective umbrella 315 and discharge tube 307 to predetermined positions. The input unit (IU) 320 includes various operation parts for inputting settings and the like of the strobe device 300. The displaying unit 321 displays various states and the like of the strobe device 300.

The strobe microcomputer 310 controls operations of each part in the strobe device 300 The strobe microcomputer 310 is configured to be a one-chip IC circuit with a built-in microcomputer including, for example, CPU, ROM, RAM, input/output control circuit (I/O control circuit), multiplexer, timer circuit, EEPROM, A/D converter, and D/A converter. The accessory determination unit 322 is a detection unit configured to detect whether the removably mountable bounce adapter 10 and color filter 20 are mounted on the light emitting unit 350. Based on detection results of the accessory determination unit 322, the strobe microcomputer 310 determines whether the bounce adapter 10 and color filter 20 are mounted. Detailed configurations of the bounce adapter 10 and color filter 20 and a method for determining whether they are mounted will be described later.

The strobe microcomputer 310 includes color temperature information of the mounted optical accessories (bounce adapter and color filter). The color temperature information is transmitted to the camera body 100 through the signal line SC. Based on the color temperature information transmitted from the strobe device 300, the camera body 100 corrects color information in accordance with white balance during shooting. In a case where the strobe microcomputer 310 recognizes that the bounce adapter 10 is mounted, the strobe microcomputer 310 moves the irradiation part including the reflective umbrella 315 and discharge tube 307 to a preferable zooming position with using the zoom motor 325.

Figure 2A:
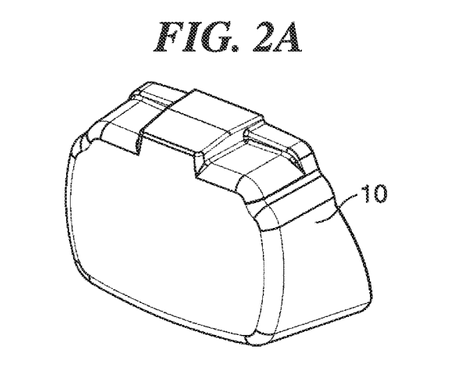
FIGS. 2A to 2C are perspective views of a bounce adapter.
Figure 2B:
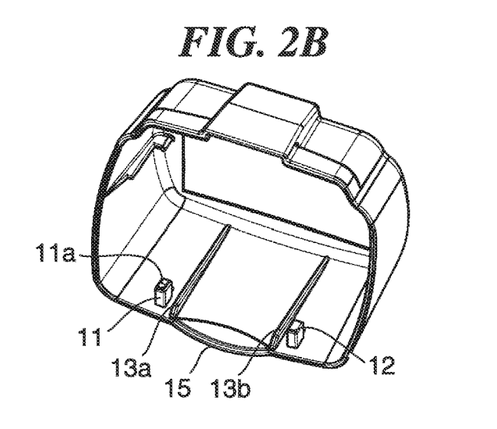
Figure 2C:
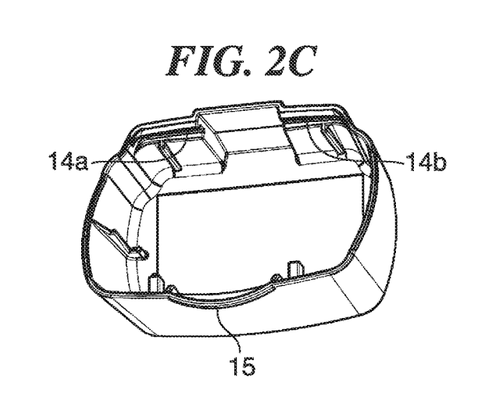
Figure 2D:
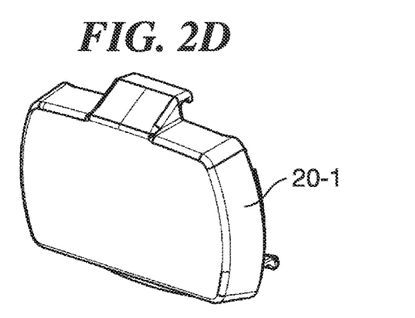
FIGS. 2D to 2G are perspective views of a color filter.
Figure 2E:
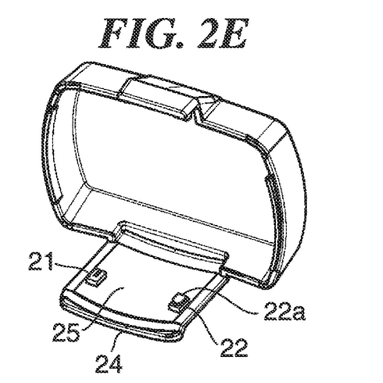
Figure 2F:
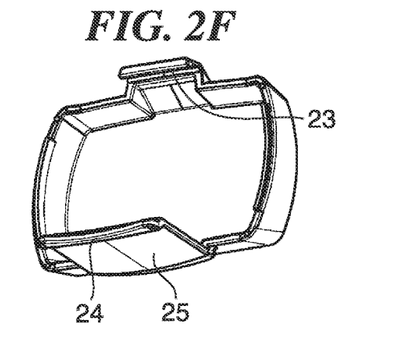
Figure 2G:
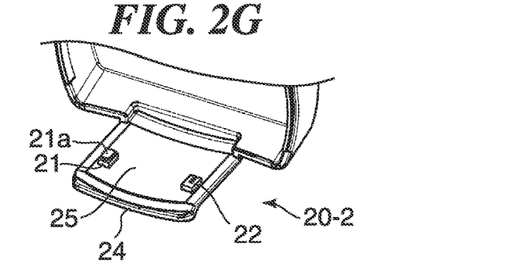

FIGS. 2A to 2C are perspective views of the bounce adapter 10. FIGS. 2D to 2F are perspective views of the color filter 20. In regard to the color filter 20 herein, it should be noted that different types of filters 20 are selectively mountable. In referring to those filters 20 independently, they will be described as color filters 20-1, and 20-2 respectively. FIGS. 2D to 2F show the color filter 20-1, and FIG. 2G shows partial perspective view of the color filter 20-2. In regard to the vertical and longitudinal directions of the bounce adapter 10 and color filter 20, vertical and longitudinal directions in a state where they are mounted on the light emitting unit 350 of the strobe device 300 are applied. In FIG. 2A, FIG. 2B, FIG. 2D, FIG. 2E, the bounce adapter 10 and color filter 20 are seen from obliquely above. In FIG. 2C, FIG. 2F, the bounce adapter 10 and color filter 20 are seen from obliquely below.

The bounce adapter 10 and color filter 20 both include side plates in top and bottom, left and right sides. As shown in FIG. 2B, inside (in an upper surface of) a bottom plate of the bounce adapter 10, protrusive parts 11, 12 are protrusively arranged in the horizontal direction. A detection protrusive part 11a is formed on an end of the protrusive part 11. Furthermore, two receiving ribs 13a, 13b are formed inside the bottom plate of the bounce adapter 10. These receiving ribs 13a, 13b are useful in a case where the color filter 20 and bounce adapter 10 are both mounted on the light emitting unit 350 and then the bounce adapter 10 and color filter 20 are simultaneously removed from the light emitting unit 350. Details of remove are described later. A front part of the bottom plate of the bounce adapter 10 is a finger hook part 15. As shown in FIG. 2C, recessed rail parts 14a, 14b are formed inside (a lower surface of) a top plate of the bounce adapter 10. Seen from a side surface, each of the recessed rail parts 14a, 14b is formed to include a hooked part and extends in the horizontal direction. Cross sectional shapes of the recessed rail parts 14a, 14b are similar to each other and positions thereof in the longitudinal direction thereof are also similar to each other.

As shown in FIG. 2E, an extension piece 25 is extensionally provided frontward from the bottom plate of the color filter 20, and a front part of the extension piece 25 functioning as a finger hooking piece is a finger hooking part 24. Protrusive parts 21, 22 are protrusively arranged in the horizontal direction inside (an upper surface of) the extension piece 25. Especially, a detection protrusive part 22a is formed in an end of the protrusive part 22 of the color filter 20-1. A recessed rail part 23 is formed inside (in a lower surface of) a top plate of the color filter 20 (FIG. 2F). The recessed rail part 23, having a cross sectional shape similar to that of the recessed rail parts 14a and 14b, is formed to include a hooked part seen from a side surface and extends in the horizontal direction. When the bounce adapter 10 and color filter 20 are mounted on the light emitting unit 350, the recessed rail parts 14a, 23, 14b are arranged in a straight line in the horizontal direction or a direction perpendicular to the optical axis C0.

In regard to the color filter 20-2, optical characteristics (colors) are different from that of the color filter 20-1 and the protrusive parts 21, 22 in the extension piece 25 are also different in shape as shown in FIG. 2G. For example, the detection protrusive part is not provided to the end of the protrusive part 22 in the color filter 20-2. Instead, the detection protrusive part 21a is provided to an end of the protrusive part 21.

Figure 3:
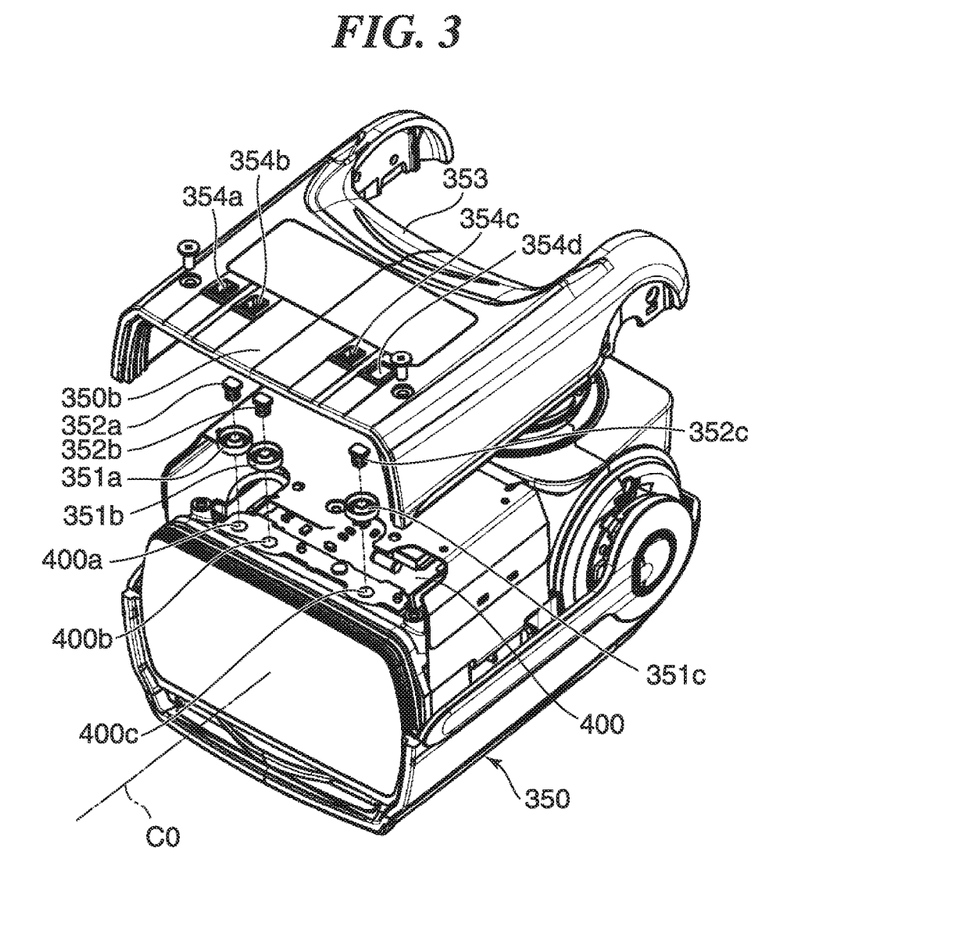
FIG. 3 is a perspective view of a light emitting unit.

FIG. 3 is a perspective view of the light emitting unit 350 showing that a bottom cover is separated. In FIG. 3, the light emitting unit 350 is seen from the front and from obliquely below. A bottom cover 353 is disposed in a bottom part of the light emitting unit 350. A lower surface of the bottom cover 353 is a bottom surface 350b of the light emitting unit 350. A flexible substrate 400 is provided to a bottom surface covered by the bottom cover 353 in the light emitting unit 350. Connection parts for a detection switch 400a, 400b, 400c as detection parts are provided to the flexible substrate 400.

Substantially, rectangular-shaped holes 354a, 354b, 354c, 354d are formed in the bottom cover 353 so as to be arranged in a direction perpendicular to the optical axis C0 (in the horizontal direction). Corresponding to the connection parts for the detection switch 400a, 400b, 400c, detection switch seals 351a, 351b, 351c which function as drip-proof seals are provided to the bottom surface covered by the bottom cover 353 in the light emitting unit 350. The detection switch seals 351a, 351b, 351c normally press detective protrusions 352a, 352b, 352c respectively against the bottom cover 353. Position of the holes 354a, 354b, 354c, detection switch seals 351a, 351b, 351c, detective protrusions 352a, 352b, 352c, and connection parts for the detection switch 400a, 400b, 400c respectively correspond to positions of the protrusive parts 11, 21, 12. The hole 354d corresponds to the protrusive part 22. It should be noted that the detective protrusions 352, detection switch seals 351, and connection parts for the detection switch 400a to 400c corresponding to each hole 354 are included in the accessory determination unit 322 (FIG. 1).

When mounting the bounce adapter 10 on the light emitting unit 350, the holes 354a, 354d function as first fitting parts (first recessed parts) in which the protrusive parts 11, 12 are fitted. When mounting the color filter 20 on the light emitting unit 350, the holes 354b, 354c function as second fitting parts (second recessed parts) in which the protrusive parts 21, 22 are fitted.

In the present embodiment, the holes 354a to 354c or the recessed parts function as attachment parts for the bounce adapter 10 or color filter 20. Furthermore, the holes 354a to 354c partially are used in detecting the attachment of the bounce adapter 10 or color filter 20. First, when the bounce adapter 10 is mounted, the detection protrusive part 11a (FIG. 2B) pushes up the detective protrusion 352a. Then, the detection switch seal 351a comes into contact with the connection part for the detection switch 400a and is electrically conducted so that the bounce adapter 10 is detected to be mounted completely. When the color filter 20-1 is mounted, the detection protrusive part 22a (FIG. 2E) of the protrusive part 22 pushes up the detective protrusion 352c. Then, the detection switch seal 351c comes into contact with the connection part for the detection switch 400c and is electrically conducted so that the color filter 20-1 is detected to be mounted completely. When the color filter 20-2 is mounted, the detection protrusive part 21a (FIG. 2G) of the protrusive part 21 pushes up the detective protrusion 352b. Then, the detection switch seal 351b comes into contact with the connection part for the detection switch 400b and is electrically conducted so that the color filter 20-2 is detected to be mounted completely.

It should be noted that the number of the holes 354, detective protrusions 352, connection parts for the detection switch 400a to 400c and detection switch seals 351 shown herein is an example and may be increased or decreased in accordance with types and combination of the bounce adapter 10 and color filter 20. For example, in regard to the color filter 20, two types are assumed to be selectively mounted herein but three or more types thereof are also applicable. Furthermore, a plurality of types of the bounce adapter 10 may also be selectively mountable. In such a case, the number of the holes 354, detective protrusions 352, connection parts for the detection switch 400a to 400c and detection switch seals 351 are increased. With an increase in the number of such members, protrusive parts similar to the protrusive parts 21, 22, and protrusive parts 11, 12 may be further added and additional detection protrusive parts may be preferably provided to ends of the added protrusive parts corresponding to type applied herein.

Figure 4A:
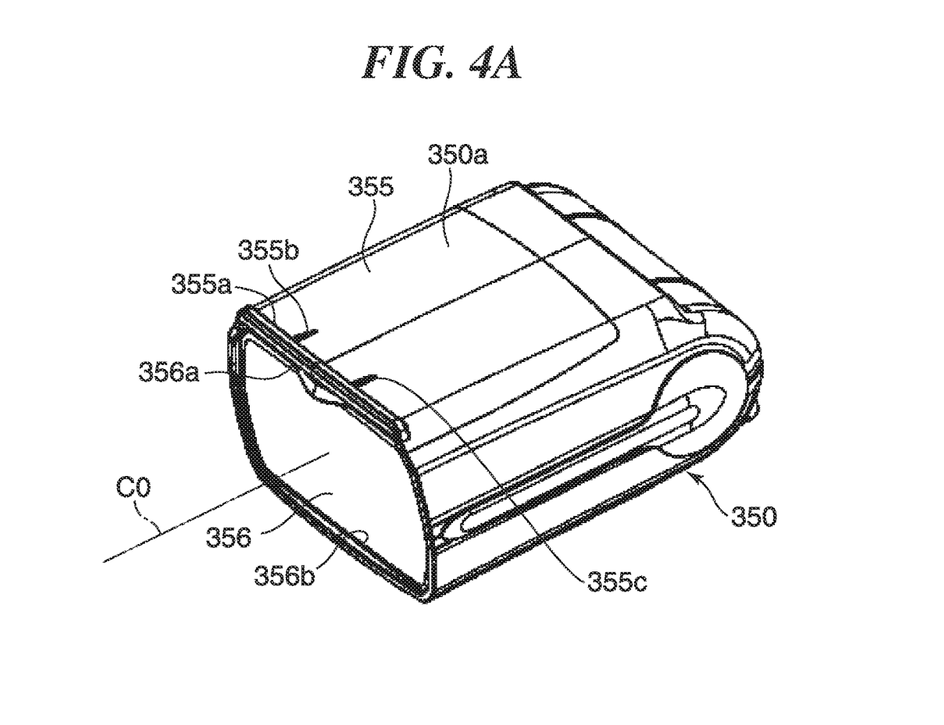
FIG. 4A is a perspective view of a light emitting unit.

FIG. 4A is a perspective view of the light emitting unit 350. In FIG. 4A, the light emitting unit 350 is seen from obliquely above. The light emitting unit 350 includes an emission window 356 in a front part thereof. The bounce adapter 10 and color filter 20 are mounted on the emission window 356. An upper edge 356a is included in an upper part of the emission window 356 and a lower edge 356b opposing to the upper edge 356a is included in a lower part of the emission window 356.

A wide panel covering 355 is disposed in an upper part of the light emitting unit 350. An upper surface of the wide panel covering 355 is a top surface 350a of the light emitting unit 350. A front peripheral part of the wide panel covering 355, that is, a frontmost part of the top surface 350a (an upper part of the upper edge 356a) of the light emitting unit 350 is formed with a protrusive attachment rib 355a. The attachment rib 355a is one piece of a protrusion extending in the horizontal direction and is substantially parallel to the upper edge 356a and substantially perpendicular to the optical axis C0. The attachment rib 355a functions as a first engagement part (first protrusive part) engaged with the recessed rail parts 14a, 14b when the bounce adapter 10 is mounted. The attachment rib 355a also functions as a second engagement part (second protrusive part) engaged with the recessed rail part 23 when the color filter 20 is mounted.

Triangular ribs 355b, 355c are formed in two adjacent positions in a back of the attachment rib 355a of the wide panel covering 355. The triangular ribs 355b, 355c are disposed in positions where the attachment rib 355a is substantially divided into three along the horizontal direction. An interval of the triangular ribs 355b, 355c is modestly larger than a width of the recessed rail part 23 of the color filter 20 in the horizontal direction. In mounting the color filter 20, the triangular ribs 355b, 355c sandwich the recessed rail part 23 of the color filter 20 and function as attachment guides of the color filter 20. Accordingly, a position of the color filter 20 in the horizontal direction is appropriately controlled so that the color filter 20 can be mounted smoothly.

Figure 4B:
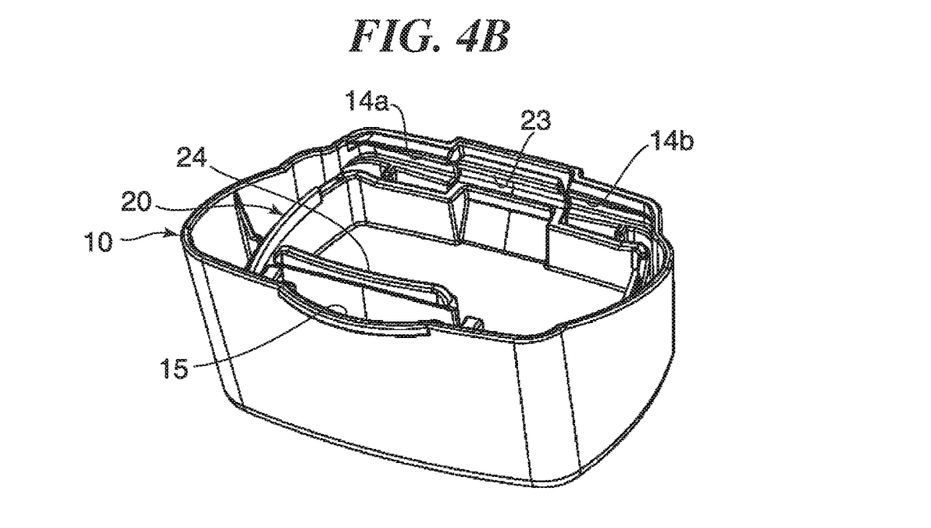
FIG. 4B is a perspective view showing a state that the bounce adapter and color filter are combined.

FIG. 4B is a perspective view of a state in which the bounce adapter 10 and color filter 20 are combined. When the bounce adapter 10 and color filter 20 are mounted on the emission window 356 of the light emitting unit 350, the color filter 20 is housed in the bounce adapter 10 as shown in FIG. 4B.

Figure 5A:
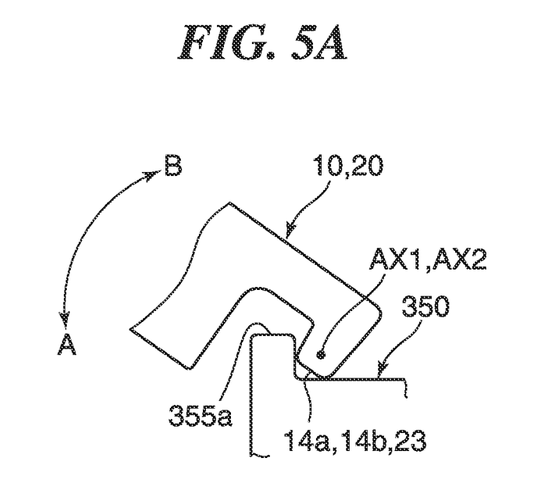
FIG. 5A is a schematic side view of an engagement part between a front upper part of the light emitting unit and recessed rail parts.
Figure 5B:
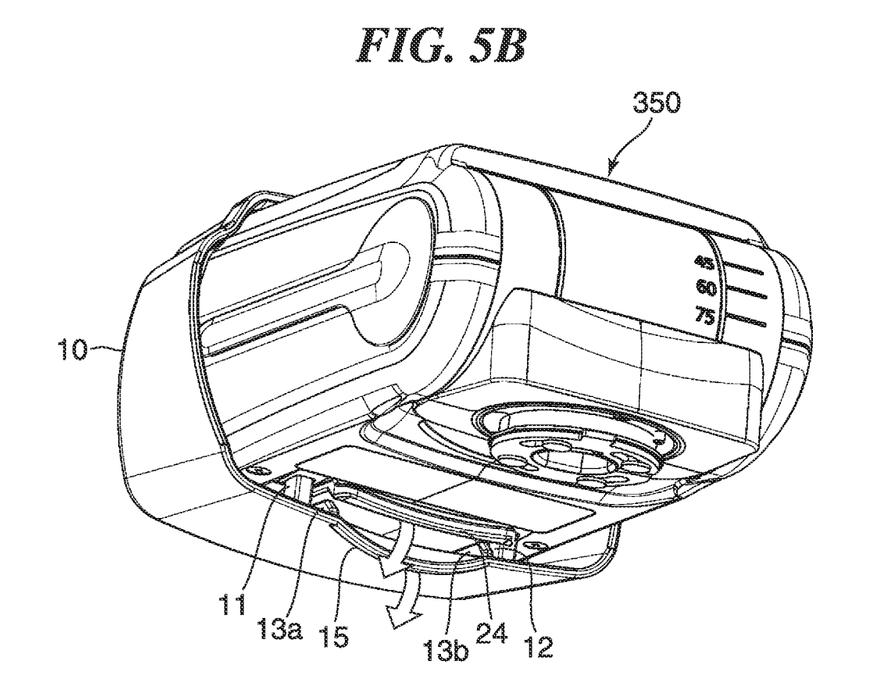
FIG. 5B is a perspective view showing a state that the bounce adapter and color filter are mounted.

Hereinafter described is a method for removably mounting the bounce adapter 10 and color filter 20 on the emission window 356 of the light emitting unit 350. FIG. 5A is a schematic side view of an engagement part between a front upper part of the light emitting unit 350 and recessed rail parts 14a, 14b, 23 of the bounce adapter 10 and color filter 20. FIG. 5B is a perspective view showing a state where the light emitting unit 350 is mounted with the bounce adapter 10 and color filter 20. In FIG. 5B, the light emitting unit 350 is seen from obliquely below.

First, in a case where the color filter 20 is independently mounted on the light emitting unit 350, a hooked part of the recessed rail part 23 is engaged with the attachment rib 355a from a backside thereof and is pivoted in an A direction shown in FIG. 5A. At that time, the color filter 20 is pivoted centering on a part where the recessed rail part 23 and attachment rib 355a are engaged. A pivotal axis of this part is substantially fixed and is referred to as a second pivotal axis AX2. As the color filter 20 is continuously pivoted in the A direction centering on the second pivotal axis AX2, the protrusive parts 21, 22 eventually fit with the holes 354b, 354c. Accordingly, the color filter 20 is completely mounted.

On the other hand, in a case where the bounce adapter 10 is independently mounted on the light emitting unit 350, hooked parts of the recessed rail parts 14a, 14b are engaged with the attachment rib 355a from the backside thereof and are pivoted in the A direction shown in FIG. 5A. As that time, the bounce adapter 10 is pivoted centering on a part where the recessed rail parts 14a, 14b and attachment rib 355a are engaged. A pivotal axis of this part is substantially fixed and is referred to as a first pivotal axis AX1. Herein, shapes of the recessed rail parts 14a, 14b, 23 seen from the side surface are equivalent so that the first pivotal axis AX1 and second pivotal axis AX2 are substantially equal. As the bounce adapter 10 is pivoted continuously in the A direction centering on the first pivotal axis AX1, the protrusive parts 11, 12 eventually fit the holes 354a, 354d. Accordingly, the bounce adapter 10 is completely mounted.

The color filter 20 can be housed in the bounce adapter 10 so that there is no difference between an operation of mounting the bounce adapter 10 with the color filter 20 being mounted and an operation of mounting the bounce adapter 10 independently. Furthermore, the first pivotal axis AX1 and second pivotal axis AX2 are equal from a point of view of design and are substantially equal even though errors during manufacture or operation are taken into consideration. Therefore, it is possible to combine the color filter 20 and bounce adapter 10 and then mount them simultaneously.

In a case of mounting simultaneously, the color filter 20 and bounce adapter 10 are preferably combined as shown in FIG. 4B before mounted. When the color filter 20 is appropriately housed in the bounce adapter 10, the recessed rail parts 14a, 23, 14b are arranged in a straight line. With the color filter 20 and bounce adapter 10 combined, the hooked parts of the recessed rail parts 14a, 23, 14b are engaged with the attachment rib 355a from the backside thereof and are pivoted in the A direction shown in FIG. 5A centering on the first pivotal axis AX1 (and the second pivotal axis AX2). With the color filter 20 and bounce adapter 10 pivoted in the A direction, the protrusive parts 21, 22 eventually fit with holes 354b, 354c. Almost at the same time, the protrusive parts 11, 12 fit with holes 354a, 354d. Accordingly, the color filter 20 and the bounce adapter 10 are completely mounted substantially simultaneously.

Next, in a case where the bounce adapter 10 is removed independently, the finger hooking part 15 is operated downward as shown by an arrow in FIG. 5B so as to release the fitting of the protrusive parts 21, 22 and holes 354b, 354c. Then, the bounce adapter 10 is pivoted in a B direction shown in FIG. 5A centering on the first pivotal axis AX1 so as to be removed. There is no difference between an operation of removing the bounce adapter 10 with the color filter 20 being mounted and an operation of removing the bounce adapter 10 independently. On the other hand, in a case of removing the color filter 20 when the color filter 20 is mounted independently, the finger hooking part 24 is operated downward as shown by the arrow in the FIG. 5B so as to release the fitting of the protrusive parts 21, 22 and holes 354b, 354c. Then, the color filter 20 is pivoted in the B direction shown in FIG. 5A centering on the second pivotal axis AX2 so as to be removed.

Furthermore, it is possible to remove the bounce adapter 10 and color filter 20 simultaneously with the bounce adapter 10 and color filter 20 mounted together. In such a case, first, the finger hooking part 24 of the color filter 20 is operated downward as shown by the arrow in FIG. 5B. Accordingly, the fitting of the protrusive parts 21, 22 and holes 354b, 354c is initially released. At that time, the receiving ribs 13a, 13b of the bounce adapter 10 opposing to the extension piece 25 of the color filter 20 receive the extension piece 25. As the finger hooking part 24 is operated further downward, the fitting of the protrusive parts 11, 12 and holes 354a, 354d of the bounce adapter 10 is released. The receiving ribs 13a, 13b are in contact with the extension piece 25 of the color filter 20 so that the protrusive parts 11, 12 can be easily removed from the holes 354a, 354d without touching the finger hooking part 15. Then, the bounce adapter 10 and color filter 20 are pivoted in the B direction shown in FIG. 5A centering on the first pivotal axis AX1 (and second pivotal axis AX2) so as to be removed.

According to the present embodiment, by pivoting the color filter 20 centering on the second pivotal axis AX2 with the recessed rail part 23 engaged with the attachment rib 355a, the color filter 20 is independently removably mountable. The protrusive parts 21, 22 of the color filter 20 are fitted with the holes 354b, 354c of the light emitting unit 350 when mounting the color filter 20, and the fitting of the protrusive parts 21, 22 and holes 354b, 354c is released when removing the color filter 20. Regardless of whether the color filter 20 is mounted, the bounce adapter 10 is independently removably mountable by pivoting the bounce adapter 10 centering on the first pivotal axis AX1 with the recessed rail parts 14a, 14b engaged with the attachment rib 355a. The protrusive parts 11, 12 of the bounce adapter 10 are fitted with the holes 354a, 354d of the light emitting unit 350 when mounting the bounce adapter 10, and the fitting of the protrusive parts 11, 12 and holes 354a, 354d is released when removing the bounce adapter 10. Accordingly, it is possible to facilitate a removable mounting operation of the optical accessories. Herein, the attachment rib 355a commonly used by the bounce adapter 10 and color filter 20 is provided to the upper edge 356a among every edges surrounding the emission window 356, and the holes 354a, 354d are provided to the lower edge 356b among the edges. In other words, there is no need to provide mechanisms for attaching the bounce adapter 10 and color filter 20 to both side portions of the emission window 356 so that the both side portions which are conspicuous may have a clear-cut appearance. Accordingly, it is possible to enhance a design of an illumination device by disposing mechanisms for removably mounting the two optical accessories in the same side of the emission window 356.

Furthermore, the first pivotal axis AX1 and second pivotal axis AX2 are substantially equal so that the color filter 20 and bounce adapter 10 can be smoothly pivoted when removably mounting the color filter 20 and bounce adapter 10 on the emission window 356 with the color filter 20 and bounce adapter 10 combined. Consequently, it is possible to facilitate the operation of integrally pivoting the two optical accessories and removably mounting those two optical accessories simultaneously. What is more, the holes 354a, 354d and holes 354b, 354c are disposed in positions substantially equal in the direction of the optical axis C0 so that the color filter 20 and bounce adapter 10 can be simultaneously mounted more smoothly.

Furthermore, in mounting the color filter 20, the triangular ribs 355b, 355c function as the attachment guides for the color filter 20 and also function as control units configured to appropriately control the position of the color filter 20 in the horizontal direction. Accordingly, the color filter 20 can be easily and smoothly mounted on an appropriate position. Furthermore, when the finger hooking part 24 of the color filter 20 is operated downward so as to release the fitting of the protrusive parts 21, 22 and holes 354b, 354c, the receiving ribs 13a, 13b of the bounce adapter 10 function as connecting parts which receive the extension piece 25 of the color filter 20. Consequently, it is possible to further facilitate the operation of integrally pivoting the two optical accessories and removing those two members simultaneously. The attachment rib 355a commonly used by the bounce adapter 10 and color filter 20 is formed as one piece of the protrusion and hence have a simple configuration.

The detection protrusive part 22a provided to the protrusive part 22 and the detection protrusive part 21a provided to the protrusive part 21 are prepared corresponding to the types of the color filter 20, and the type of the completely mounted color filter 20 is detected based on the fitting of the protrusive parts 21, 22 and holes 354b, 354c. The protrusive parts 21, 22 also function as fitting mechanisms for mounting. Therefore, it is possible to achieve a mounting detection system for a plurality of types of the color filter 20 with a simple configuration. As mentioned above, it should be noted that, in regard to the bounce adapter 10, a mounting detection system for a plurality of types of the bounce adapter 10 may also be achieved with a simple configuration.

In the first embodiment, the attachment rib 355a is configured to be one piece of the protrusion commonly used for attachment of the bounce adapter 10 and color filter 20. On the other hand, in a second embodiment of the present invention, an attachment rib 355a for the bounce adapter 10 and that for the color filter 20 are provided to different positions in the direction of the optical axis C0.

Figure 6:
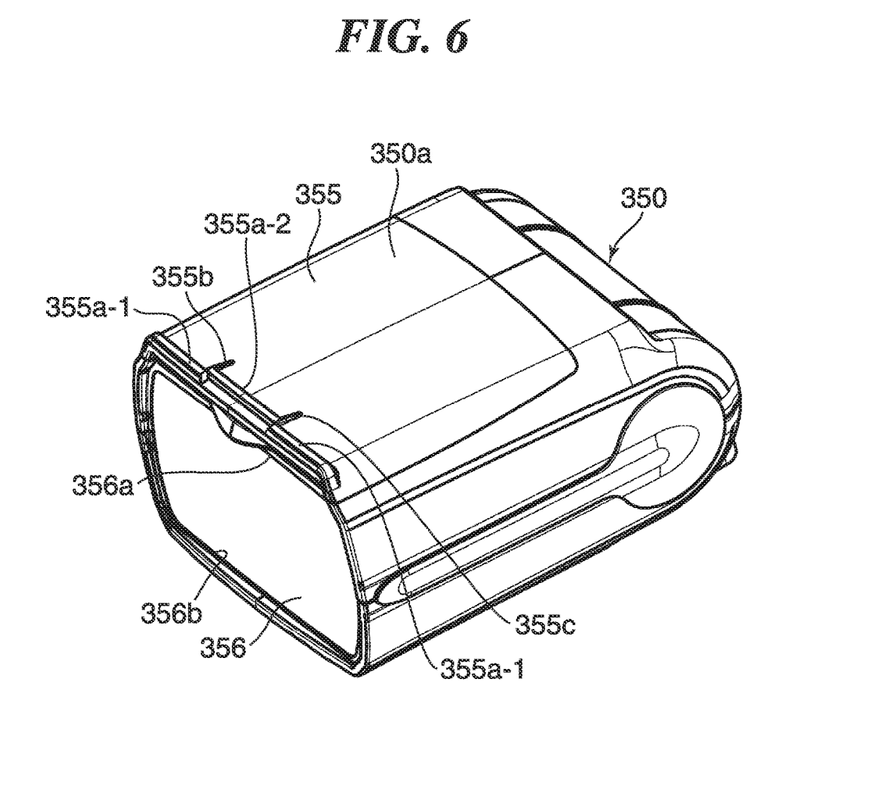
FIG. 6 is a perspective view of a light emitting unit according to a second embodiment.

FIG. 6, corresponding to FIG. 4A, is a perspective view of a light emitting unit 350 of the strobe device 300 according to a second embodiment. The front peripheral part of the wide panel covering 355, that is, the frontmost part of the top surface 350a (the upper part of the upper edge 356a) of the light emitting unit 350 is formed with attachment ribs 355a-1, 355a-2, 355a-1. These attachment ribs 355a-1, 355a-2 are substantially parallel to the upper edge 356a and substantially perpendicular to the optical axis C0. Compared with the two attachment ribs 355a-1, the attachment rib 355a-2 in the middle is disposed modestly backward in the direction of the optical axis C0. The triangular ribs 355b, 355c are adjacently formed in both ends of the attachment rib 355a-2. The two attachment ribs 355a-1 function as first engagement parts engaged with the recessed rail parts 14a, 14b when mounting the bounce adapter 10, while the attachment rib 355a-2 functions as a second engagement part engaged with the recessed rail part 23 when mounting the color filter 20. In the direction of the optical axis C0, when the bounce adapter 10 and color filter 20 are mounted, positions of the recessed rail parts 14a, 14b of the bounce adapter 10 and a position of the recessed rail part 23 of the color filter 20 are different in accordance with a difference between positions of the attachment ribs 355a-1 and attachment rib 355a-2. The other configurations are similar to those in the first embodiment.

The positions of the attachment ribs 355a-1 and attachment rib 355a-2 in the direction of the optical axis C0 are different. In accordance with such a difference, the second pivotal axis AX2 is thus located backwards compared with the first pivotal axis AX1. The operation of removably mounting the bounce adapter 10 or the color filter 20 independently is similar to that in the first embodiment and each operation can be carried out smoothly. On the other hand, the pivotal axes AX1, AX2 are not remotely separated but are adjacently abutted so that even when removably mounting the bounce adapter 10 and color filter 20 combined with each other, the bounce adapter 10 and color filter 20 are pivoted centering on one of the pivotal axes AX1, AX2, or centering on a position between the pivotal axes AX1, AX2 as a new pivotal axis. Therefore, the bounce adapter 10 and color filter 20 can be removably mounted simultaneously.

According to the present embodiment, an effect similar to the first embodiment can be achieved not only in regard to enhancement of the design of the illumination device by disposing mechanisms for removably mounting the two optical accessories in the same side of the emission window 356 but also in regard to facilitation of the operation of removably mounting the optical accessories.

It should be noted that a disposition relationship between the attachment ribs 355a-1 and attachment rib 355a-2 in the direction of the optical axis C0 may be inverted compared with the example shown in FIG. 6.

It should be noted that the positions where the engagement part and fitting part are disposed may be inverted in the vertical direction in each of the abovementioned embodiments. Accordingly, the first engagement parts (355a, 355a-1) and second engagement parts (355a, 355a-2) are provided to one of the top surface 350a or bottom surface 350b of the light emitting unit 350. The first fitting parts (354a, 354d) and second fitting parts (354b, 354c) may be preferably provided to the other surface of the top surface 350a or bottom surface 350b of the light emitting unit 350.

In each of the abovementioned embodiment, it should be noted that respective relational shapes of the first engagement parts (355a, 355a-1) and first parts corresponding to the engagement parts (14a, 14b) may be interchanged compared with the example described above. Similarly, respective relational shapes of the second engagement parts (355a, 355a-2) and a second part corresponding to the engagement parts (23) may be interchanged compared with the example described above. Furthermore, respective relational shapes of the first fitting parts (354a, 354d) and first parts corresponding to the fitting parts (11, 12), and respective relational shapes the second fitting parts (354b, 354c) and second parts corresponding to the fitting parts (21, 22) may also be interchanged compared with the examples described above.

Furthermore, the first engagement parts (355a, 355a-1), second engagement parts (355a, 355a-2), first fitting parts (354a, 354d), and second fitting parts (354b, 354c) are provided to an outside of the emission window 356. However, they may be provided to an inside of the emission window 356. By the way, they are provided to the upper edge 356a and lower edge 356b of the emission window 356. However, from a point of view of achieving facilitation of removably mounting the optical accessories, it should be noted that they may also be provided to each edge in the left and right instead of each edge in the top and bottom so that the optical accessories may be pivoted in the horizontal direction.

It should be noted that the color filter 20 is fitted inside the bounce adapter 10, but an inverted configuration may also be applicable. Uses and types of the optical accessories mounted on the light emitting unit 350 should not be restricted to the embodiments described above. Furthermore, the number of the optical accessories simultaneously mountable to the light emitting unit 350 may be three or more. Among those optical accessories, the present invention may be applicable to a relationship between two of them.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-004452, filed Jan. 13, 2016 which is hereby incorporated by reference wherein in its entirety.

What is claimed is:

1. An illumination device to which a first optical accessory and a second optical accessory are mountable so that the first optical accessory and second optical accessory are arranged in a front part of a light emitting unit,
    wherein one of a top surface and a bottom surface of the light emitting unit is provided with a first protrusive part to be engaged with the first optical accessory and a second protrusive part to be engaged with the second optical accessory,
    wherein the other of the top surface and the bottom surface of the light emitting unit is provided with a first recessed part to be engaged with the first optical accessory and a second recessed part to be engaged with the second optical accessory, and
    wherein the first protrusive part is not lined with the first recessed part, and the second protrusive part is not lined with the second recessed part.

2. The illumination device according to claim 1, wherein the first protrusive part and the second protrusive part are arranged in a direction substantially perpendicular to an optical axis of the light emitting unit.

3. The illumination device according to claim 1, wherein the first protrusive part and the second protrusive part are linearly arranged in a direction substantially perpendicular to an optical axis of the light emitting unit.

4. The illumination device according to claim 1, wherein the first recessed part and the second recessed part are arranged in a direction substantially perpendicular to an optical axis of the light emitting unit.

5. The illumination device according to claim 1, comprising:
    a first detector configured to detect whether the first optical accessory is mounted; and
    a second detector configured to detect whether the second optical accessory is mounted,
    wherein the first detector is disposed in a position corresponding to the first recessed part and the second detector is disposed in a position corresponding to the second recessed part.

6. The illumination device according to claim 1, wherein the first protrusive part and the second protrusive part extend in a direction substantially perpendicular to an optical axis of the light emitting unit.

7. The illumination device according to claim 1, wherein the first protrusive part is farther than the second protrusive part from a center of the light emitting unit in a direction substantially perpendicular to an optical axis of the light emitting unit, and the first recessed part is farther than the second recessed part from the center of the light emitting unit in the direction substantially perpendicular to the optical axis of the light emitting unit.

8. The illumination device according to claim 1, wherein the first protrusive part is provided to the top surface of the light emitting unit.

* * * * *